(12) United States Patent
Witwer et al.

(10) Patent No.: US 9,897,162 B2
(45) Date of Patent: Feb. 20, 2018

(54) TWO-DIMENSIONAL VIBRATION ISOLATOR

(71) Applicant: HONEYWELL INTERNATIONAL INC., Morristown, NJ (US)

(72) Inventors: Kevin Witwer, Glendale, AZ (US); Tim Daniel Barber, Litchfield Park, AZ (US); Stella Silvana Dearing, Buckeye, AZ (US); Ken Young, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1193 days.

(21) Appl. No.: 14/151,415

(22) Filed: Jan. 9, 2014

(65) Prior Publication Data
US 2015/0192188 A1 Jul. 9, 2015

(51) Int. Cl.
*F16F 13/06* (2006.01)
*F16F 15/02* (2006.01)
*F16F 15/08* (2006.01)
*F02C 7/20* (2006.01)

(52) U.S. Cl.
CPC .............. *F16F 15/085* (2013.01); *F02C 7/20* (2013.01); *F05D 2260/96* (2013.01)

(58) Field of Classification Search
CPC .... F16F 1/027; F16F 7/10; F16F 7/104; F16F 9/04; F16F 9/16; F16F 9/18; F16F 9/19; F16F 9/20; F16F 9/361; F16F 13/00; F16F 13/06; F16F 15/005; F16F 15/022; F16F 15/023; F16F 15/027; F16F 2230/10; F16F 2234/06; F16F 2238/00; F16D 3/66; F16D 3/80; B25J 9/126; B64G 1/283; B64G 1/285; B64G 1/286; B64G 1/641
USPC ....... 267/140.11, 140.13; 248/562, 564, 565, 248/631, 632; 188/280, 297, 298
See application file for complete search history.

(56) References Cited

U.S. PATENT DOCUMENTS

| | | | |
|---|---|---|---|
| 2,312,718 A | 3/1943 | Kouyoumjian | |
| 2,930,455 A * | 3/1960 | Williams | F16F 15/027 188/298 |
| 3,101,937 A | 8/1963 | Stearns | |
| 3,250,508 A * | 5/1966 | Kfoury | F16F 15/02 188/378 |
| 5,219,051 A | 6/1993 | Davis | |
| 5,305,981 A * | 4/1994 | Cunningham | B64G 1/283 244/173.2 |
| 5,775,472 A | 7/1998 | Osterberg et al. | |
| 5,816,373 A | 10/1998 | Osterberg et al. | |
| 6,082,508 A | 7/2000 | Davis | |
| 6,634,472 B1 | 10/2003 | Davis et al. | |
| 8,272,786 B2 | 9/2012 | Cottrell | |
| 8,444,121 B2 | 5/2013 | Hadden et al. | |
| 2013/0051982 A1* | 2/2013 | Hindle | F01D 25/164 415/119 |

(Continued)

Primary Examiner — Robert A Siconolfi
Assistant Examiner — San Aung
(74) Attorney, Agent, or Firm — Lorenz & Kopf, LLP

(57) ABSTRACT

An apparatus is provided for vibration damping and isolation. The apparatus includes an annular spring portion including a resilient member that is substantially equally resilient in two dimensions, an annular bellows portion including at least two pairs of diametrically opposed bellows providing damping in the two dimensions, and a rigid connection member coupling the annular spring portion and the annular bellow portion in parallel to one another.

20 Claims, 8 Drawing Sheets

(56) References Cited

U.S. PATENT DOCUMENTS

2013/0186105 A1 7/2013 Meachman et al.

* cited by examiner

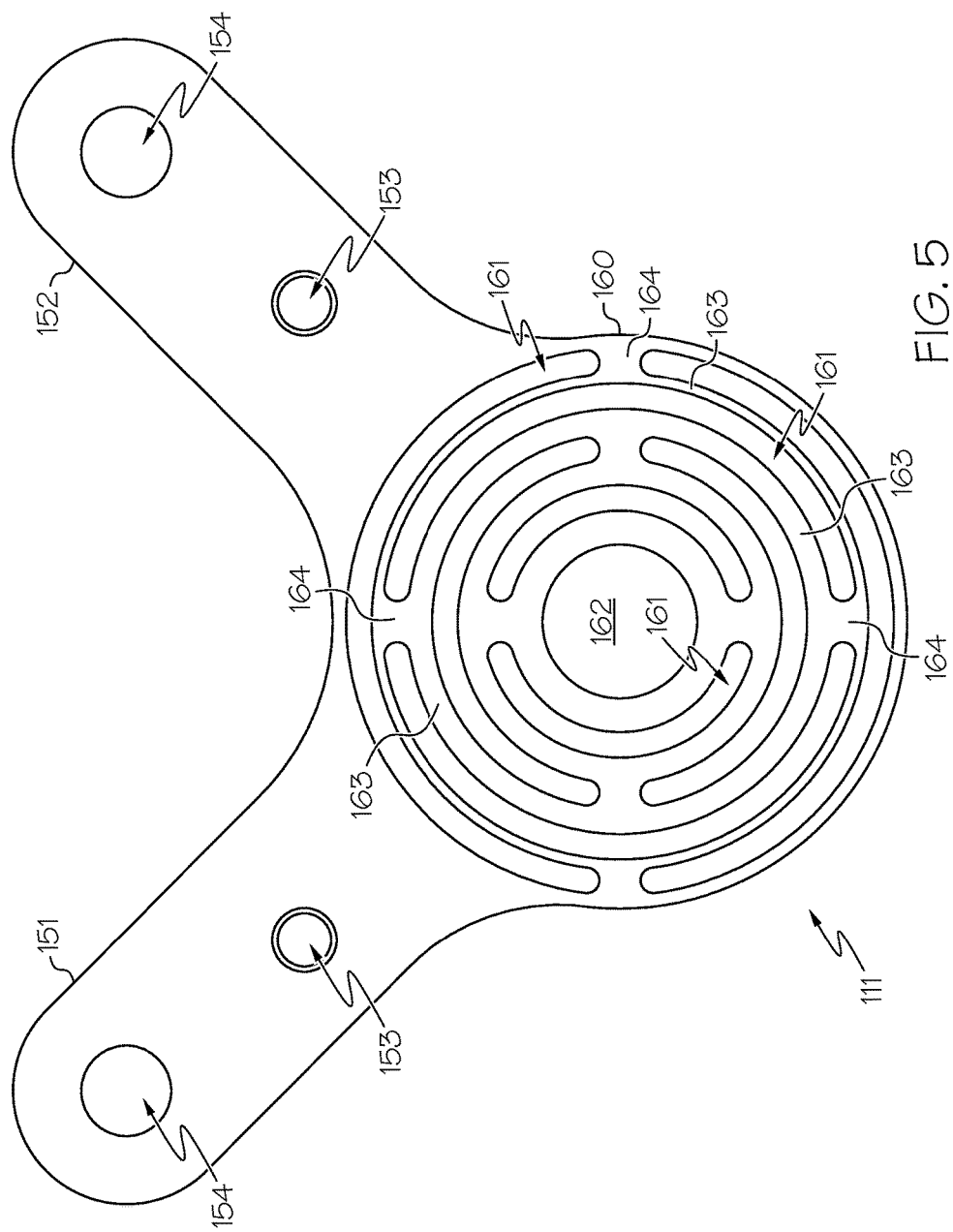

ized strut that mechanically acts spring in parallel with a series spring and damper, disclosed in U.S. Pat. No. 5,332,070...

TWO-DIMENSIONAL VIBRATION ISOLATOR

TECHNICAL FIELD

The present invention generally relates to vibration damping and isolation systems, and more particularly relates to isolators.

BACKGROUND

Aircraft systems, such as a turbine engine and its components, may be susceptible to disturbances that produce structural vibrations. Such vibrations may be attributed to mechanical components or assemblies, such as rotating or fluid-directing components. For the most part, because these systems tend not to have significant, inherent damping, these structural vibrations may degrade system performance and even cause structural fatigue over time, in addition to causing undesirable vibrations with the passenger compartment of the aircraft. Therefore, an efficient means of providing damping and isolation to the system may be needed.

Typically, to minimize performance degradation caused by vibrations, a passive-mass damping and isolation system is used for damping the structure and isolating the passenger cabin of the aircraft. One example of a passive-mass damping and isolation system is the D-STRUT™ isolation strut, manufactured by Honeywell International Inc. of Morristown, N.J. The D-STRUT™ isolation strut is a three-parameter vibration isolation system that mechanically acts like a spring ($K_A$) in parallel with a series spring ($K_B$) and damper ($C_A$) and is disclosed in U.S. Pat. No. 5,332,070 entitled "Three Parameter Viscous Damper and Isolator" by Davis et al. This patent is hereby incorporated by reference.

The D-STRUT™ isolation strut includes a hollow shaft and a piston that is configured to slidably move through the shaft. The piston includes a flange that extends radially from a midsection thereof. The flange has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other.

Although the conventional D-STRUT™ isolation strut operates effectively in most applications, it may not be appropriate to implement in other applications. For example, in some implementations, damping is required in more than one dimension. One possible solution would be to implement multiple vibration isolators positioned orthogonally to one another to dampen vibrations in two or more dimensions. However, due to size and weight restrictions on aircraft, employing multiple dampers may not be feasible.

Accordingly, it is desirable to have an isolation strut that is capable of damping and isolating vibration in more than one dimension. In addition, it is desirable for the isolation strut to have a compact, lightweight design. Moreover, it is desirable for the isolation strut to have a simple configuration that is relatively inexpensive to implement. Furthermore, other desirable features and characteristics of the present invention will become apparent from the subsequent detailed description of the invention and the appended claims, taken in conjunction with the accompanying drawings and this background of the invention.

BRIEF SUMMARY

An apparatus is provided for vibration damping and isolation. In one exemplary embodiment, an apparatus includes an annular spring portion including a resilient member that is substantially equally resilient in two dimensions, an annular bellows portion including at least two pairs of diametrically opposed bellows providing damping in the two dimensions, and a rigid connection member coupling the annular spring portion and the annular bellow portion in parallel to one another.

In another exemplary embodiment, an apparatus includes an annular spring portion comprising a resilient member that is substantially equally resilient in two dimensions and comprising a central opening and an annular bellows portion comprising at least two pairs of diametrically opposed bellows providing damping in the two dimensions and further comprising a central opening. The system further includes a rigid connection member coupling the annular spring portion and the annular bellow portion in parallel to one another and a cylindrical coupling member that passes through the central opening of the annular spring portion, the central opening of the annular bellows portion, and a coupling portion of a component that requires vibration damping. The rigid connection member and the cylindrical coupling member extend parallel to one another in an axis that is orthogonal to the two dimensions and the annular spring portion couples with a base portion, thereby providing the damping system to receive and dampen vibrations between the base portion and the component.

This brief summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein:

FIG. 5 depicts an exemplary annular spring suitable for use in the exemplary vibration damping system shown in FIGS. 2-4B.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. While the isolation struts are discussed with reference to exemplary embodiments, any one of numerous other embodiments of a fluid filled isolation strut may be implemented as well. Fluid, as used in the present invention, can be any viscous liquid or any gas known in the art. Furthermore, there is no intention to be bound by any expressed or implied theory presented in the preceding technical field, background, brief summary, or the following detailed description.

Embodiments of the present disclosure are generally directed to improved vibration isolation and damping systems. The disclosed embodiments include an annular spring that has substantially constant stiffness in all radial directions. This spring attaches to a ring that connects the motion of the spring to a fixed housing with two pairs of diametrically-opposed bellows. Further, there is restricted flow passage that connects each individual bellow to its diametrically-opposed partner. Exemplary embodiments of the present disclosure are described in greater detail, below, in connection with the Figures.

Figure 1:
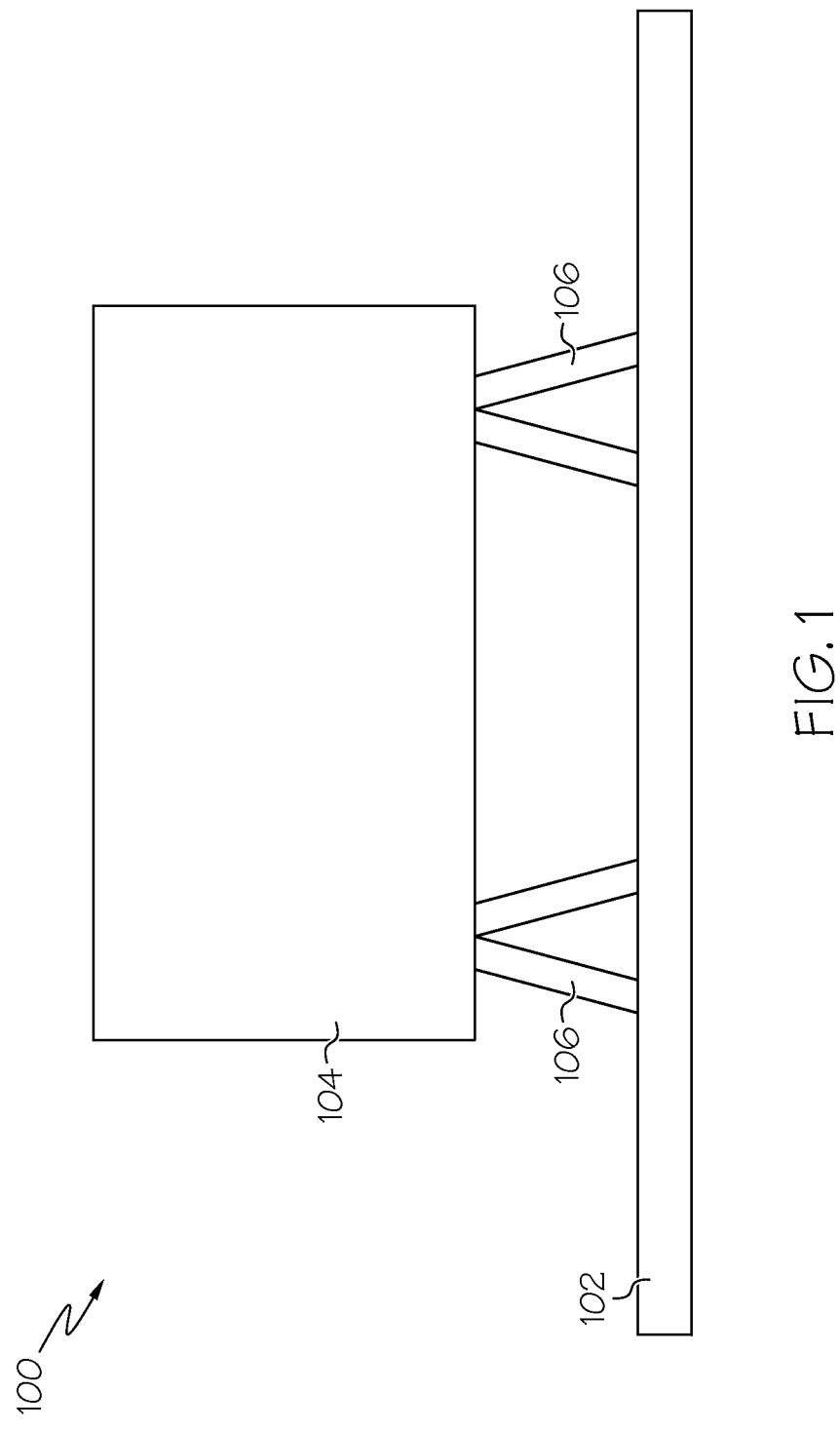
FIG. 1 is a schematic of an exemplary system having vibration damping and isolation.

FIG. 1 illustrates an exemplary system 100 having vibration damping and isolation. The system 100 may be implemented in any one of numerous environments, such as in space, terrestrially, or under water. The system 100 includes a base 102, a component 104, and at least one vibration isolation apparatus 106. The base 102 is configured to provide a platform to which the component 104 and vibration isolation apparatus 106 are coupled and may be any one of numerous application-appropriate devices. For example, in an aircraft application, the base 102 can be a housing portion of a gas turbine engine, for example, or any one of numerous other conventionally-used aircraft apparatus. The component 104 is a device that preferably needs vibration damping and isolation to operate effectively. The component 104 may be any one of numerous devices, such as, for example, a pre-cooler for a gas turbine engine, as will be described in greater detail below with regard to FIG. 2.

The vibration isolation apparatus 106 dampens and isolates vibration that may be experienced by the component 104 and thus, is coupled between the component 104 and the base 102. Although a single vibration isolation apparatus 106 may be used, it may be preferable to employ more than one vibration isolation apparatus 106. In one exemplary embodiment, two vibration isolation apparatus 106 are used in an adjacent configuration to isolate vibration. In another exemplary embodiment, three or more vibration isolation apparatus 106 may be employed.

Figure 2:
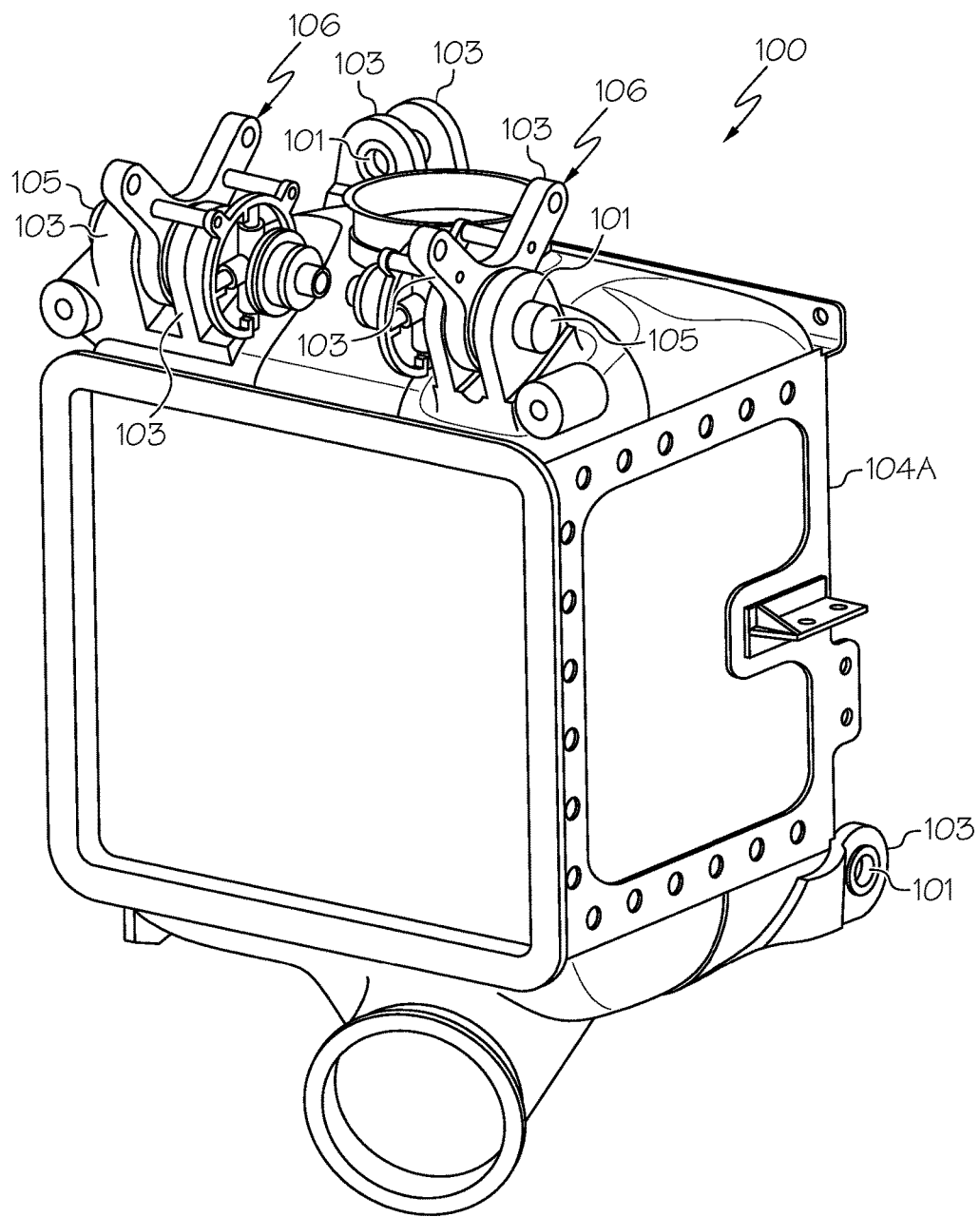
FIG. 2 is an isometric projection view of an exemplary vibration damping system implemented on a gas turbine engine pre-cooler in accordance with various embodiments of the present disclosure.
Figure 3A:
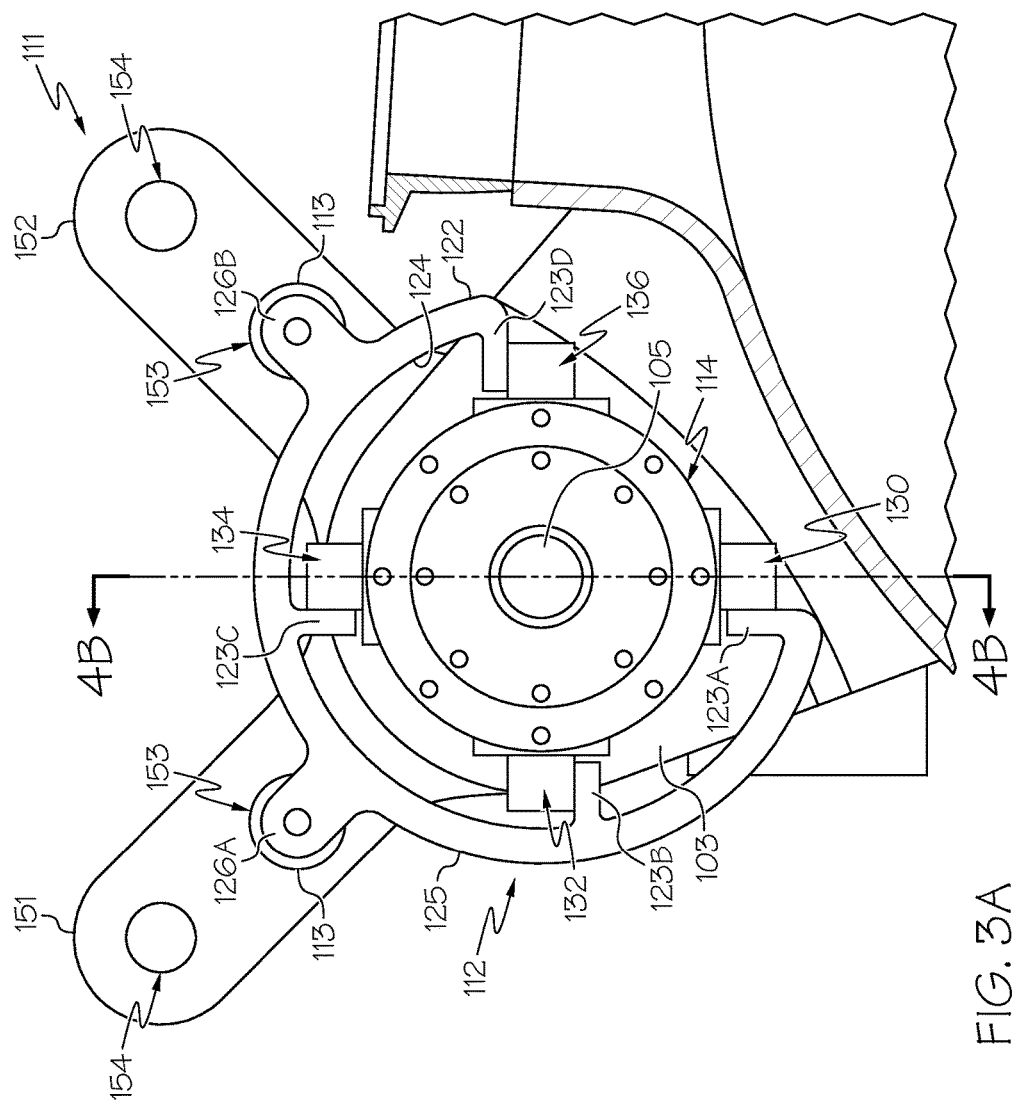
FIGS. 3A and 3B are front and side views, respectively, of the exemplary vibration damping system shown in FIG. 2.
Figure 3B:
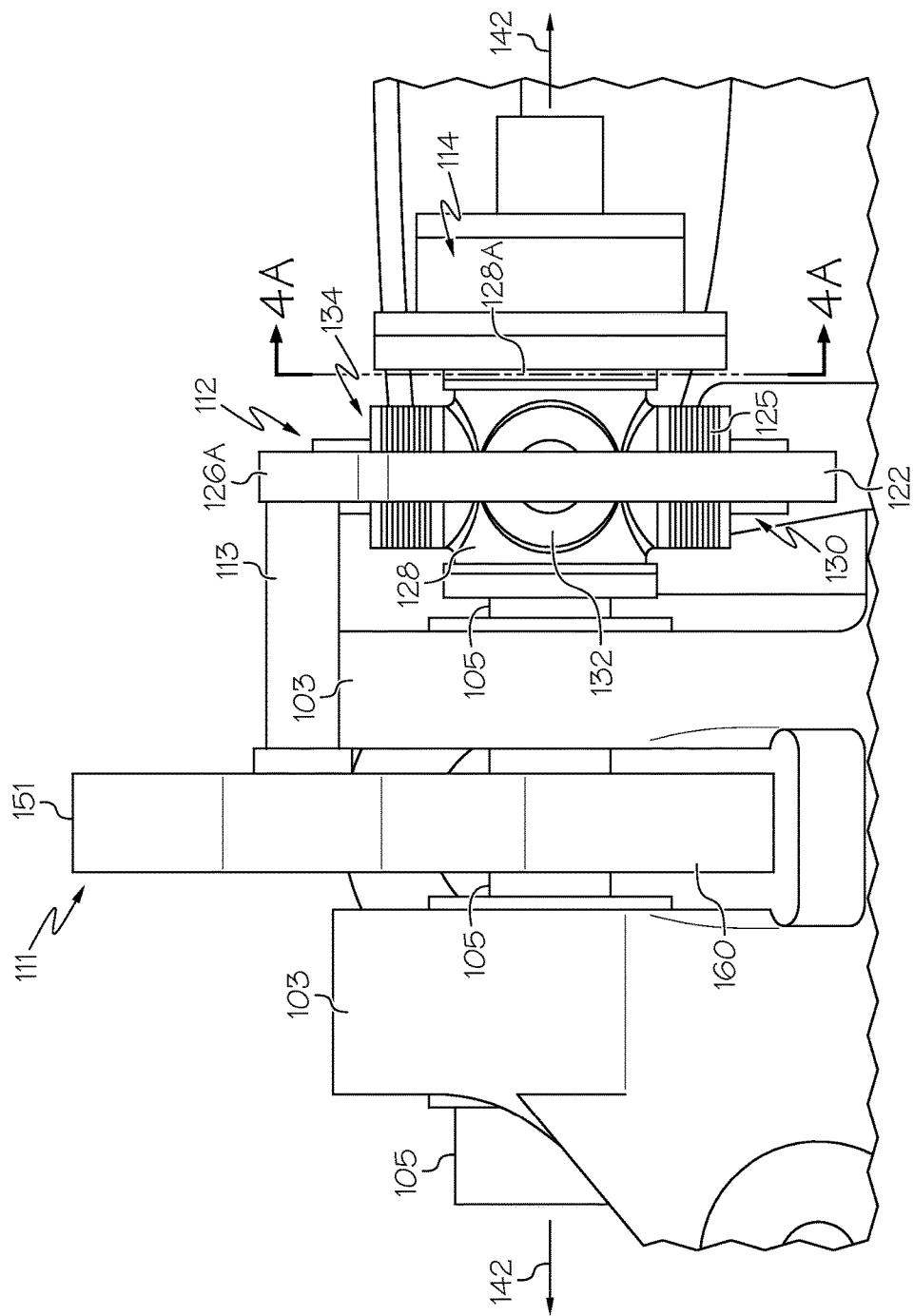

In one exemplary, non-limiting implementation, as shown in FIG. 2, the vibration isolation apparatus is implemented to dampen vibration that is caused by an operating pre-cooler 104A that forms part of a gas turbine engine for use in aircraft or other applications. (As known in the art, a pre-cooler is a heat exchanger that cools turbine engine bleed air; air flowing at high rates of speed through the interior channels thereof may cause undesirable vibrations that require damping.) The exemplary pre-cooler 104A includes a plurality of lugs 103. The lugs 103 may be configured in pairs, for example, as shown. Each lug 103 includes a substantially circular opening 101 for receiving a rigid cylindrical member 105 therethrough, such as an appropriately-sized bolt, rivet, dowel, or other like means. Each cylindrical member 105 is received through two lugs 103, namely through two adjacently paired lugs 103. The pre-cooler 104A illustrated in FIG. 2 includes at least four lug 103 pairs, three of which are located on the upper illustrated surface thereof, the fourth being located (and only partially-visible) on a back illustrated surface. Some or all of the lug 103 pairs may receive a cylindrical member 105. As shown, only two of the lug 103 pairs include a member 105 received through openings 101. The vibration isolation apparatus 106 may likewise be configured with one or more circular openings (not visible in FIG. 2) for receiving the cylindrical member 105 therethrough. As such, the lugs 103, namely the lug 103 pairs as illustrated, provide a suitable attachment means for coupling a vibration isolation apparatus 106 to the pre-cooler 104A (or other component 104). Due to the cylindrical nature of the members 105, vibration transmitted from the pre-cooler 104A in any radial direction with respect to the members 105 can be effectively transmitted to the vibration isolation apparatus 106, through which the cylindrical member 105 is also positioned, thereby allowing a single apparatus to damp vibrations in two dimensions. Greater detail regarding an exemplary vibration isolation apparatus 106 is provided in connection with FIGS. 3A-6B, which illustrate the apparatus 106 and the lugs 103, but do not illustrate other portions of the pre-cooler 104A (or other component 104) for clarity in illustration.

With reference now generally to FIGS. 3A-4B, an exemplary vibration isolation apparatus 106 includes an annular spring portion 111, an annular bellows portion 112 spaced apart longitudinally along the cylindrical member 105 with respect to the annular spring portion 111 (as used herein, the term "longitudinal" is used with respect to longitudinal axis 142 through cylindrical member 105, and the term "radial" is used with respect to any radial direction therefrom), one or more rigid connection portions 113 extending longitudinally between the annular spring portion 111 and the annular bellows portion to 112 to provide a rigid connection therebetween, and optionally a temperature compensation device 114 disposed longitudinally adjacent to the annular bellows portion 112 at a further longitudinal distance from the annular spring 111.

Regarding the annular bellows portion 112, the annular bellows portion 112 may be generally configured as a two axis damper having a semi-circular retaining member 122 (extending about 270 degrees around axis 142). Retaining member 122 may alternately have any convenient shape such as square, etc. The interior wall 124 of retaining member 122 has a plurality of inwardly directed abutments 123A-D, which may form a holding base for one end each of a plurality of bellows 130, 132, 134, and 136, respectively. The bellows 130, 132, 134, and 136 may be configured in any known manner, and may include suitable attachment portions (not separately illustrated) to couple the bellows with the abutments 123A-D. Bellows 130, 132, 134, and 136 extend radially inward toward longitudinal axis 142 and their other ends fit within a common bellows housing 128. The bellows housing includes a cylindrical opening 129 (visible in FIGS. 4A and 4B) oriented longitudinally therethrough to receive the cylindrical member 105 therethrough, thus coupling the bellows portion 112 to the lugs 103, an ultimately the component 104. Bellows 130-136 may be disposed, for example, at a 90 degree spacing about the housing 128. In this manner, bellows 130 and 134 are diametrically opposed to one another, and bellows 132 and 136 are diametrically opposed to one another. The exterior wall 125 of retaining member 122 has a plurality of outwardly directed abutments 126A-B, which form a holding base for one end each of a plurality of the rigid connection portions 113, which as noted above rigidly couple the annular bellows portion 112 to the annular spring portion 111.

Figure 4A:
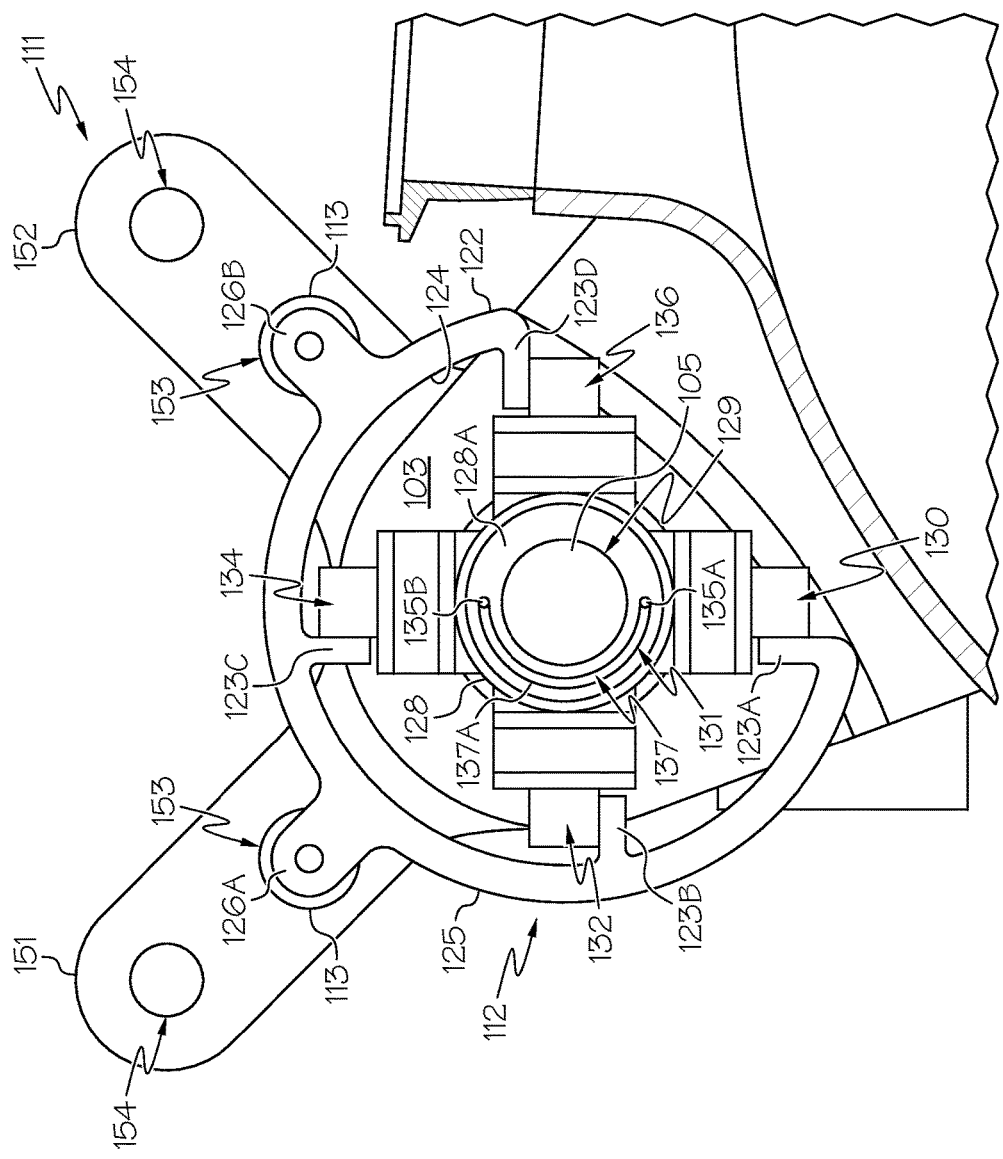
FIG. 4A is front, radial cross-sectional view of the exemplary vibration damping system based on the front view shown in FIG. 3A.
Figure 4B:
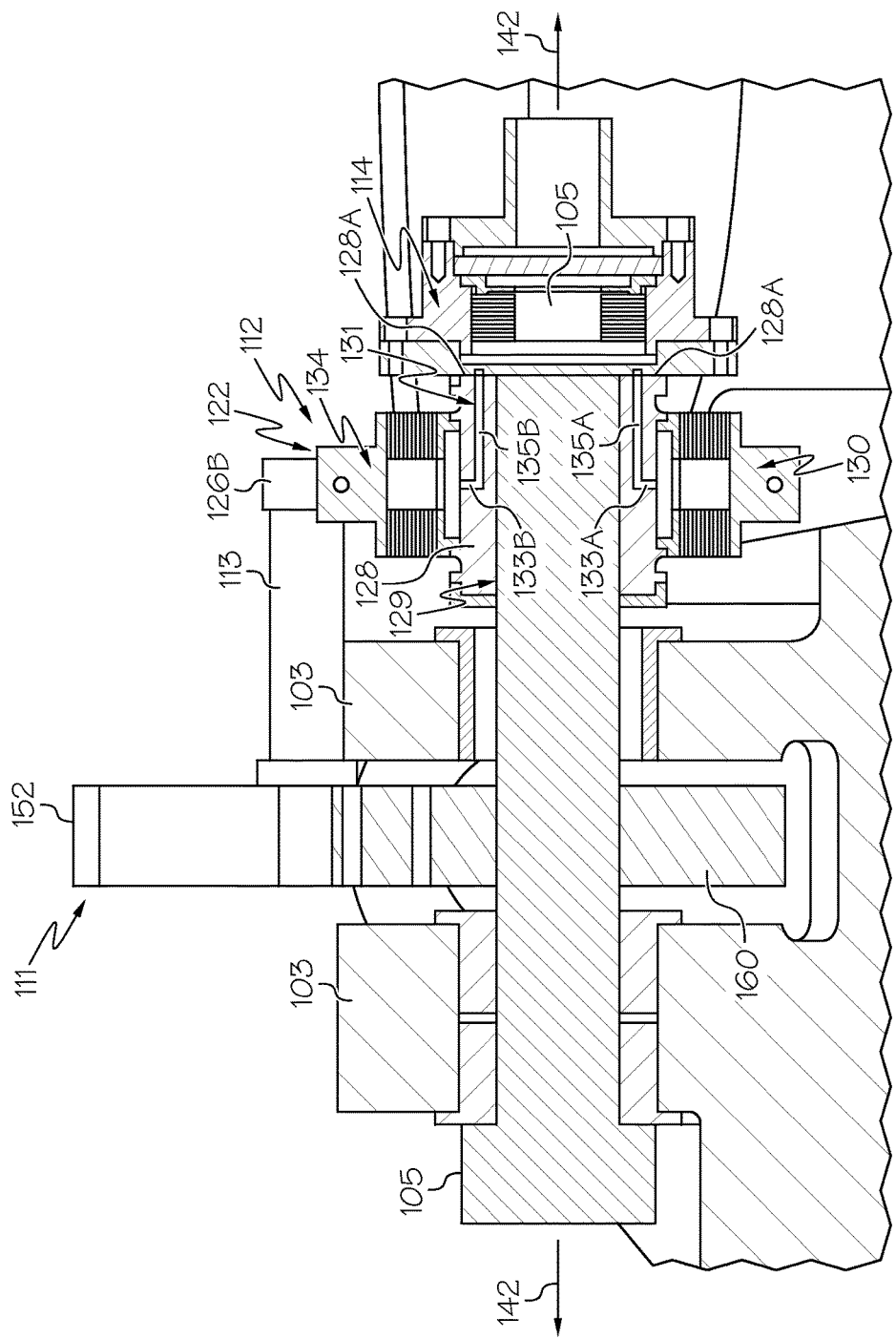
FIG. 4B is a side, longitudinal cross-sectional view of the exemplary vibration damping system based on the side view shown in FIG. 3B.
Figure 6B:
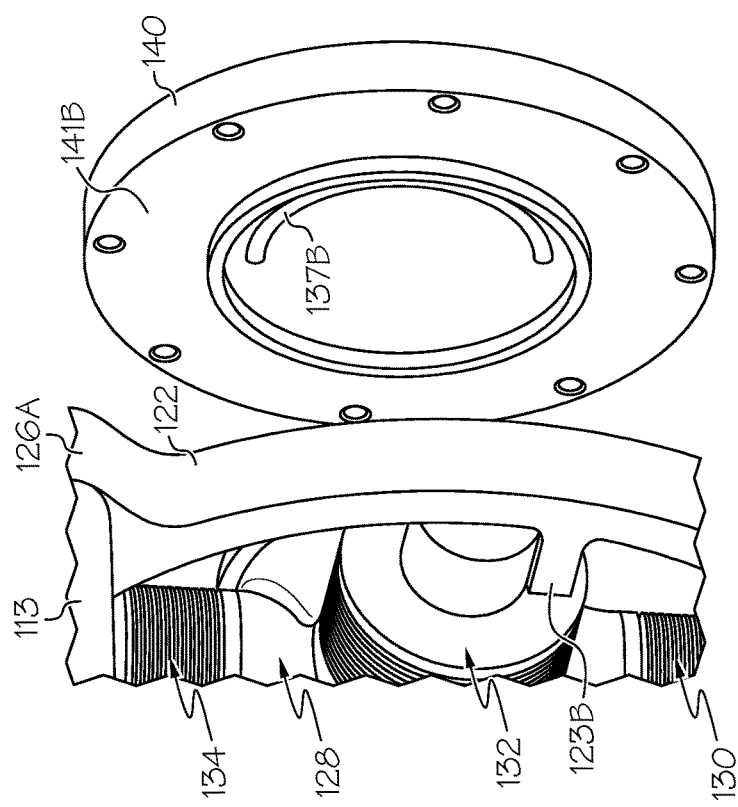
FIGS. 6A and 6B are isometric projection views of a capping portion of the exemplary vibration damping system shown in FIGS. 2-4B.
Figure 6A:
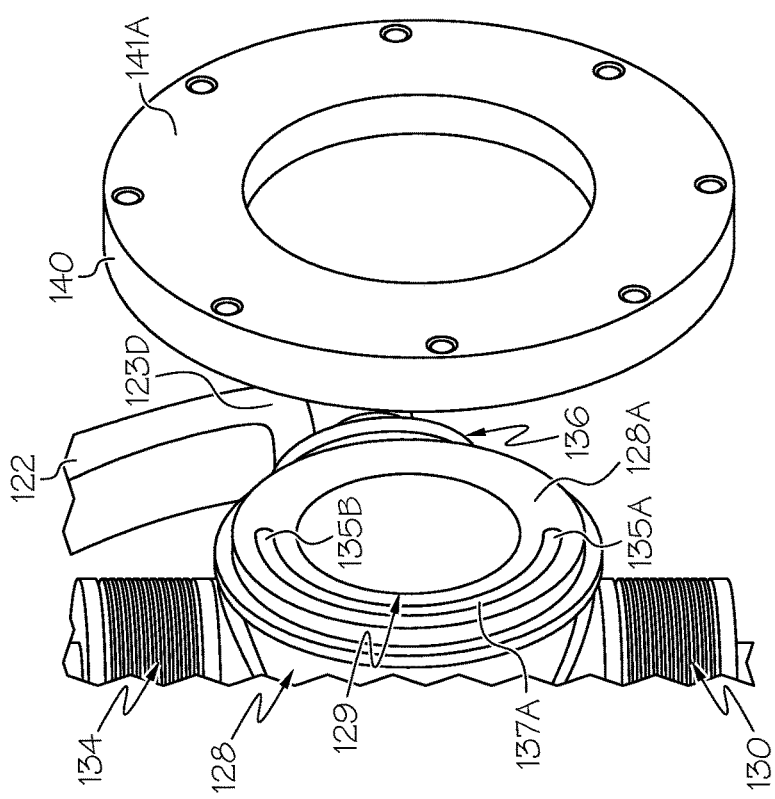

A damping fluid may be inserted into the interior of bellows 130-136. As used herein, the term "fluid" may refer to either a liquid or a gas, the selection of which for use in the bellows will be with the level of ordinary skill in the art, and dependent upon the particular application and tuning for which the isolator apparatus 106 is to be employed. The housing 128 includes a plurality of restricted flow passages to allow fluid to flow between diametrically opposed bellows pairs (e.g., 130 and 134, 132 and 136). As known in the art, fluid flow between bellows through a restricted flow passage, which simultaneous increases the volume of one bellows while decreasing the volume of its paired bellows, provide vibration damping. The restricted flow passages cannot extend linearly between the diametrically opposed bellows pairs, due to the presence of the cylindrical member 105 extending through the housing 128, as noted above. FIGS. 4A and 4B illustrate an exemplary restricted flow passage 131 between bellows 130 and 134. From each bellows 130, 134, the passage 131 includes radial portions 133A, 133B, respectively, which extend radially inward from the bellows, but stops prior to reaching the opening 129 (see FIG. 4B). The passage continues from radial portions 133A, 133B with longitudinal portions 135A, 135B, respectively. Longitudinal portions 135A, 135B extend longitudinally through the housing 128, parallel to the cylindrical member 105, to a front face 128A of the housing 128. Longitudinal portions 135A, 135B are connected to one another, thus completing the restricted flow passage 131, by a circumferential portion 137 that extends circumferentially along the front face 128A of the housing 128. As shown best in FIGS. 6A and 6B, half of the generally circular cross section of the circumferential portion 137 (shown as half 137A in FIG. 6A) is provided into the front face 128A, while the other half (shown as half 137B in FIG. 6B) is provided into the rear face 141B of a mating cap 140 that is disposed abuttingly adjacent to the front face 128A, and seals the fluid within the bellows portion 112. Mating cap 140 may be sealed to housing 128 by any suitable means, such as welding, fasteners, etc. Mating cap may further abuttingly couple with the temperature compensation device 114 at the front face 141A thereof.

Regarding diametrically opposed bellows pair 132, 136, although not separately illustrated, it will be appreciated that bellows pair 132, 136 includes a similarly configured restricted flow passage to allow fluid to flow therebetween to provide damping. Thus, with the bellows 130-136 oriented at about 90 degrees with respect to one another, and with diametrically opposed bellows being fluidly connected to one another, damping may be provided in any radial direction with respect to longitudinal axis 142. That is, during the operation of the isolation apparatus 106, when a force is exerted on the cylindrical member 105, fluid is pushed between one or both of the diametrically opposed bellows pairs, and through the restrictive flow passage(s) 131, thereby providing a damping effect.

As previously noted, bellows portion 112 is rigidly coupled with annular spring portion 111 via retaining member 122, abutments 126A-B, and longitudinally-oriented rigid connection portions 113. Greater detail regarding the annular spring portion 111 is provided with regard to FIG. 5. As shown therein, the annular spring portion 111 includes a plurality of lugs 151, 152, each of which includes a first opening 153 and a second opening 154, the second opening being disposed radially outward along the lugs 151, 152 with respect to the first opening 153. The first openings 153 receive the rigid connection portions 113, thereby rigidly connecting the annular spring portion 111 to the annular bellows portion 112. The second openings 154 are configured to couple the spring portion 111 (and consequently the entire apparatus 106) to the base 102 (not shown).

The annular spring portion 111 further includes a resilient portion 160 that is configured in the form of multi-lobed ribbon wrapped around a central opening 162. The annular spring portion 111 is configured so as to have a substantially constant stiffness in all radial directions. Accordingly, the resilient portion 160 includes a plurality of concentric, annular rings 163 connected to each other by radially-extending connection members 164, and separated apart from one another by a plurality of concentric, annular void spaces 161. The cylindrical member 105 may be disposed through the central opening 162. Thus, annular spring portion 111 reduces the transmission of vibratory forces transmitted to the component 104 to which it is attached (by means of the lugs 151, 152). Annular spring portion may be formed from any suitable resilient material including various metals and alloys.

In operation of the vibration isolator apparatus 106, any force from the movement of the annular bellows portion 112 (for example by vibration of the cylindrical member in any radial direction with respect to longitudinal axis 142) is transmitted via the rigid connections portions 113 to the annular spring portion 111 (and vice versa). Additionally, vibration of the cylindrical member 105 is also received directly into the annular spring portion 111 as the member 105 passes through the central opening 162 thereof. Thus, it will be appreciated that the annular spring portion 111 and the annular bellows portion 112 are provided in a parallel configuration with respect to one another to provide vibration isolation and damping.

As an additional matter, the temperature compensation device 114 may be included in the vibration isolation apparatus 106 to compensate for fluid expansion and/or contraction in response to temperature changes. The temperature compensation device 114 may have any one of numerous suitable configurations and may be disposed within the isolation apparatus 106 in any one of numerous manners, for example as illustrated in coupling abutment with the sealing cap 140, and namely the front face 141A thereof. The temperature compensation device 114 may also include a central opening for receiving the rigid cylindrical member therethrough.

There has now been provided a vibration isolator that is capable of damping and isolating vibration in more than one dimension. In addition, the vibration isolator has a compact, lightweight design. Moreover, the vibration isolator has a simple configuration that is relatively inexpensive to implement While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A damping system, comprising:
    an annular spring portion comprising a resilient member that is substantially equally resilient in two dimensions, and wherein the annular spring portion comprises a central opening;
    an annular bellows portion comprising at least two pairs of diametrically opposed bellows providing damping in the two dimensions, and wherein the at least two pairs of diametrically opposed bellows are coupled through a common bellows housing, the bellows housing comprising a central opening;
    a rigid connection member coupling the annular spring portion and the annular bellows portion in parallel to one another; and
    a rigid vibration-transmitting member passing through the central opening of the annular spring portion and the central opening of the annular bellows portion for transmitting a vibration in the two dimensions from a component to the damping system.

2. The damping system of claim 1, wherein the rigid vibration-transmitting member connects to a pre-cooler of a gas turbine engine.

3. The damping system of claim 1, wherein the at least two pairs of diametrically opposed bellows are oriented orthogonally with respect to one another.

4. The damping system of claim 3, wherein the bellows housing comprises at least two restricted flow passages, each restricted flow passage providing fluid flow between one of the at least two pairs of diametrically opposed bellows.

5. The damping system of claim 4, wherein the restricted flow passages comprise an axial portion, a longitudinal portion, and a circumferential portion to provide a fluid connection between a respective pair of bellows in a manner so as to avoid passing through the central opening of the bellows housing.

6. The damping system of claim 1, wherein the annular spring portion comprises a connection portion for coupling with a base portion to which a component requiring damping is coupled.

7. The damping system of claim 6, wherein the annular bellows portion comprises a retaining member for coupling with the at least two pairs of diametrically opposed bellows.

8. The damping system of claim 7, wherein the rigid connection member couples between the connection portion of the annular spring and the retaining portion of the annular bellows.

9. The damping system of claim 6, wherein the annular spring portion comprises a resilient portion comprising a plurality of concentric, annular rings, spaced apart by concentric, annular void spaces, and wherein the central opening of the annular spring portion is disposed at a center of the resilient portion.

10. The damping system of claim 9, wherein the resilient portion comprises a resilient metal or metal alloy.

11. The damping system of claim 1, wherein the rigid connection member extends parallel to an axis that is orthogonal to the two dimensions.

12. The damping system of claim 1, further comprising a temperature compensation device.

13. The damping system of claim 12, wherein the temperature compensation device is coupled to the annular bellows portion.

14. The damping system of claim 1, wherein the annular bellows comprises a liquid or a gas damping fluid sealed therewithin.

15. The damping system of claim 6, wherein the component requiring damping is a gas turbine engine pre-cooler.

16. The damping system of claim 15, wherein the base portion is a housing portion of a gas turbine engine to which the pre-cooler is coupled.

17. A damping system, comprising:
    an annular spring portion comprising a resilient member that is substantially equally resilient in two dimensions, wherein the annular spring portion comprises a central opening, wherein the annular spring portion comprises a connection portion for coupling with a base portion to which a component requiring damping is coupled, wherein the annular spring portion comprises a resilient portion comprising a plurality of concentric, annular rings, spaced apart by concentric, annular void spaces, and wherein the central opening of the annular spring portion is disposed at a center of the resilient portion;
    an annular bellows portion comprising at least two pairs of diametrically opposed bellows providing damping in the two dimensions, and wherein the at least two pairs of diametrically opposed bellows are coupled through a common bellows housing, the bellows housing comprising a central opening; and
    a rigid connection member coupling the annular spring portion and the annular bellows portion in parallel to one another.

18. The damping system of claim 17, wherein the resilient portion comprises a resilient metal or metal alloy.

19. The damping system of claim 17, wherein the component requiring damping is a gas turbine engine pre-cooler.

20. The damping system of claim 19, wherein the base portion is a housing portion of a gas turbine engine to which the pre-cooler is coupled.

* * * * *